US011714526B2

(12) United States Patent
LaFave

(10) Patent No.: US 11,714,526 B2
(45) Date of Patent: Aug. 1, 2023

(54) ORGANIZE ACTIVITY DURING MEETINGS

(71) Applicant: Dropbox, Inc., San Francisco, CA (US)

(72) Inventor: Adam LaFave, Seattle, WA (US)

(73) Assignee: Dropbox Inc., San Francisco, CA (US)

( * ) Notice: Subject to any disclaimer, the term of this patent is extended or adjusted under 35 U.S.C. 154(b) by 0 days.

(21) Appl. No.: 17/488,904

(22) Filed: Sep. 29, 2021

(65) Prior Publication Data

US 2023/0101672 A1    Mar. 30, 2023

(51) Int. Cl.
*G06F 3/0482* (2013.01)
*G06F 9/451* (2018.01)
*H04L 65/401* (2022.01)
*G06F 21/62* (2013.01)

(52) U.S. Cl.
CPC ............ *G06F 3/0482* (2013.01); *G06F 9/451* (2018.02); *H04L 65/4015* (2013.01); *G06F 21/6218* (2013.01)

(58) Field of Classification Search
CPC .... G06F 3/0482; G06F 9/451; G06F 21/6218; H04L 65/4015
See application file for complete search history.

(56) References Cited

U.S. PATENT DOCUMENTS

| | | | |
|---|---|---|---|
| 6,317,777 B1 | 11/2001 | Skarbo et al. | |
| 6,629,129 B1 | 9/2003 | Bookspan et al. | |
| 7,353,252 B1 | 4/2008 | Yang et al. | |
| 8,209,181 B2 * | 6/2012 | Heckerman | G09B 19/00 725/87 |
| 8,812,510 B2 | 8/2014 | Romanov et al. | |
| 9,165,290 B2 | 10/2015 | Wessling et al. | |
| 9,264,480 B1 * | 2/2016 | Saylor | H04L 67/06 |
| 9,742,833 B2 | 8/2017 | Lewis et al. | |
| 9,754,320 B2 | 9/2017 | Calman et al. | |
| 9,817,912 B2 | 11/2017 | Willis et al. | |
| 9,824,335 B1 | 11/2017 | Vander Mey | |

(Continued)

FOREIGN PATENT DOCUMENTS

WO   WO-2005071665 A1 *   8/2005   ......... G10L 15/1815

OTHER PUBLICATIONS

"Can I Attach a Zoom Meeting Link, Document or Map to my Invitations, Confirmations or Reminders?," retrieved from https://signuphelp.zendesk.com/hc/en-us/articles/202715910-Can-I-attach-a-Zoom-meeting-link-dociiment-or-map-to-my-invitations-confirmations-or-reminders-, on Aug. 13, 2021, 4 pages.

(Continued)

*Primary Examiner* — William L Bashore
*Assistant Examiner* — Gregory A Distefano
(74) *Attorney, Agent, or Firm* — Polsinelli PC

(57) ABSTRACT

Techniques are disclosed for generating content item to virtual meeting associations based upon whether content items are accessed during a virtual meeting. During a virtual meeting, a monitoring application executing on a personal computing device detects a user-input-triggered access of a content item during a virtual meeting. In response to detecting the user-input-triggered access of the content item, the monitoring application displays, in a computer graphical user interface, an indication that the monitoring application is associating the content item with the virtual meeting. The monitoring application stores content-item-to-virtual-meeting association data that associates the content item with the virtual meeting.

20 Claims, 7 Drawing Sheets

(56) References Cited

U.S. PATENT DOCUMENTS

| | | |
|---|---|---|
| 10,230,774 B2 | 3/2019 | Saez |
| 2008/0059618 A1* | 3/2008 | May .................... G06Q 10/109 |
| | | 455/3.06 |
| 2009/0006982 A1* | 1/2009 | Curtis ................... G06Q 10/10 |
| | | 715/753 |
| 2010/0146115 A1* | 6/2010 | Bezos .................... H04L 67/06 |
| | | 709/225 |
| 2013/0018953 A1* | 1/2013 | McConnell .......... G06Q 10/109 |
| | | 709/204 |
| 2014/0149453 A1* | 5/2014 | Christiansen ....... G06F 16/4393 |
| | | 707/769 |
| 2021/0014287 A1 | 1/2021 | Kimball et al. |

OTHER PUBLICATIONS

Google Workspace, "Transfer Data From One User to Another With the Google Admin App for Android," Oct. 31, 2015, retrieved from https://workspaceupdates.googleblog.com/2016/10, on Aug. 13, 2021, 39 pages.

* cited by examiner

ORGANIZE ACTIVITY DURING MEETINGS

FIELD OF THE INVENTION

The present invention relates to techniques of monitoring relevant content items accessed during a meeting, and more specifically, organizing the relevant content items accessed during the meeting.

BACKGROUND

Conventional meetings between employees generally were conducted as in-person meetings with the majority of participants attending the meeting in person. During the meeting the presenter would typically display one or more documents using a projector and the meeting participants would follow along. However, with the shift towards more remote work, many meetings are now conducted as virtual meetings where meeting participants attend the meeting using video conferencing software. Meeting participants are provided with attachments or links to the presentation materials so that the participants can manually follow along on their own computer. Virtual meetings, however, allow participants to multitask during the meeting, either by looking up other materials related to the meeting presentation or by performing background tasks while listening to the ongoing presentation.

One of the drawbacks to attending a virtual meeting, as a participant, is that each meeting participant is responsible for keeping track of relevant content accessed during the meeting. For example, each meeting participant is responsible for keeping track of each relevant document opened and each relevant webpage accessed during the meeting. At the conclusion of the meeting, a participant may have several webpages and/or documents open that were relevant to the presentation. If the participant does not actively track the relevant content accessed during the meeting, the participant may miss, lose track, or forget to save the relevant content related to the meeting.

One solution to the problem of tracking meeting-relevant content items that were accessed during a presentation is to manually track each relevant content item accessed during the meeting. However, manually tracking each content item accessed during the meeting relies on each meeting participant to diligently track the content items they access. This process may be cumbersome to the participant and may lead to several errors and/or omissions of content items if the user does not track each relevant content item accessed.

Another solution would be to shift the responsibility of tracking relevant content to the meeting presenter or meeting host. That is, the meeting presenter or host would have to provide all relevant content to each meeting participant. This solution may be sufficient for content identified ahead of time, such as a meeting agenda or specific documents about the meeting subject matter. However, if the meeting presenter displays additional materials that were not previously provided to meeting participants, then it is up to the meeting participants to actively track new materials presented. Similarly, one or more participants may also find that certain websites on background subject matter may be relevant to the meeting. For example, if a meeting participant is new to the subject matter presented, then a website describing the basics of the subject matter may be relevant to the participant even if it is not as relevant to the presenter or other participants.

A solution that automatically keeps track of all content accessed during a meeting is possible. However, in some situations, most or all of the content accessed during a meeting is not meeting-relevant. For example, if a meeting participant is browsing social media websites during a meeting, or making personal purchases during the meeting, the user is unlikely to want the accessed web pages to be automatically associated with the meeting.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
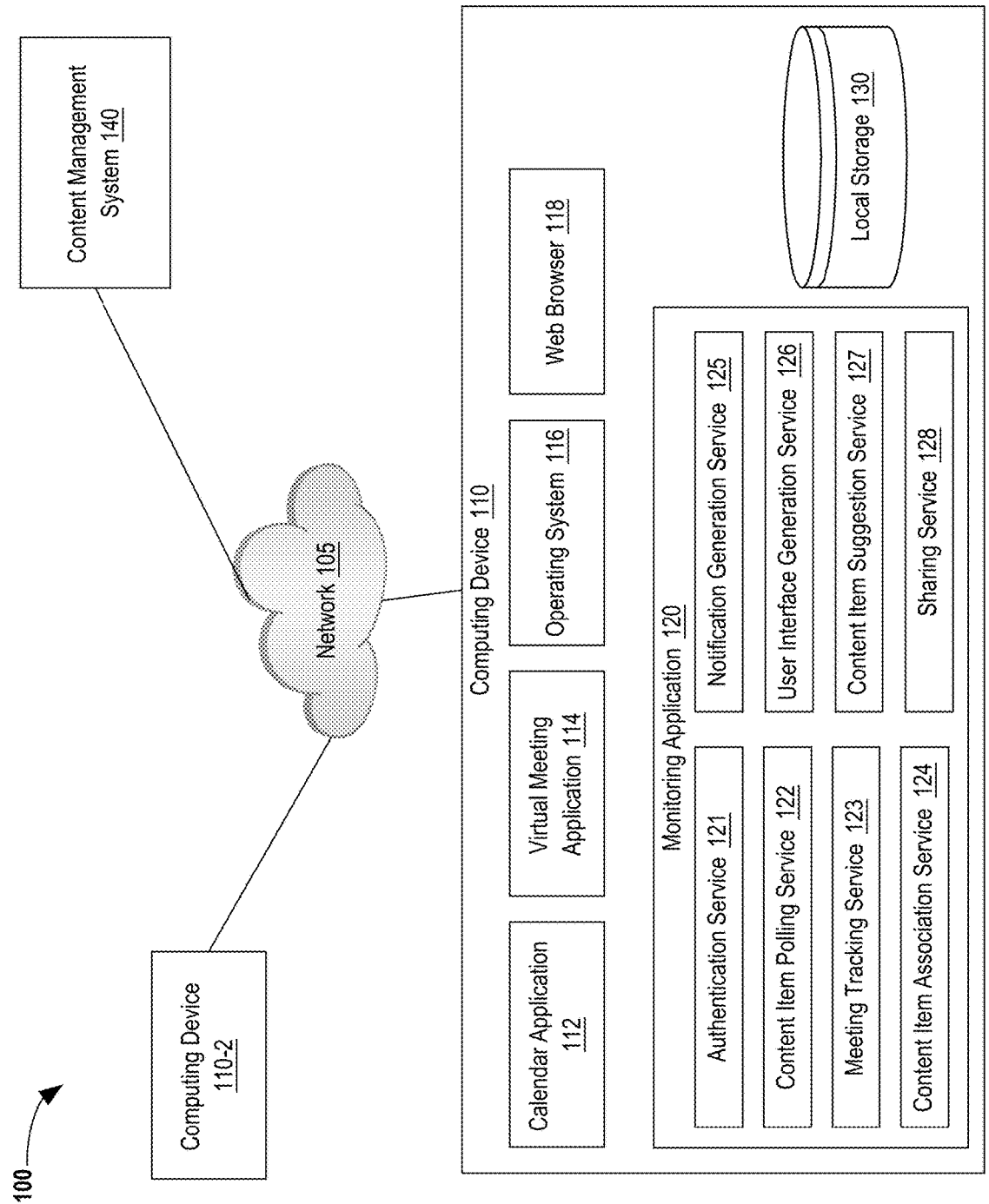
FIG. 1 is a block diagram that illustrates a system for monitoring content items accessed during a virtual meeting and generating an association between content items accessed during the virtual meeting and the virtual meeting, in accordance with one or more example implementations.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are disclosed for tracking relevant content items accessed during a virtual meeting and associating the relevant content items to the virtual meeting. A content item may represent discrete digital content that is identifiable or addressable in a content management system and/or a file management system using, for example, a file identifier, a folder identifier, a Uniform Resource Indicator (URI) (e.g., a Uniform Resource Locator (URL)), one or more identifiers of one or more data blocks that make up the digital content, one or more identifiers of one or more database records containing the digital content, or one or more identifiers of one or more data containers of the digital content. For example, a content item may correspond to a file, a folder, a web page, an online document (e.g., an online word processing or spreadsheet document), a digital photo, a digital image, digital data, text, digital audio, digital video, and streaming content. Rather than assume that all content items accessed during the meeting are meeting-relevant content items, the monitoring system provides mechanisms for distinguishing between meeting-relevant content items and other content items that are accessed during the meeting.

A monitoring application may be implemented on a user's personal computing device to monitor when content items are accessed during a virtual meeting. The monitoring application may detect when a user accesses a content item during a virtual meeting. By monitoring which content items are accessed while the user is attending a virtual meeting, the monitoring application may compile a list of content items relevant to the subject matter discussed during the virtual meeting. The virtual meeting may be presented on the user's personal computing device by a virtual meeting application executing on the user's personal computing device. In response to detecting that the user accessed the content item, the monitoring application may display a notification that indicates that the monitoring application is associating, with the current virtual meeting, the content item accessed by the user. In embodiments, the user may be provided with a control to override creation of the association. Thus, the user may avoid associations between the meeting and content items that are not meeting-relevant.

The monitoring application may store content-item-to-virtual-meeting association data that associates the content item with the virtual meeting. By associating the accessed content items during the virtual meeting to the virtual meeting, users are able to better organize and keep track of content items that the user deems relevant to the virtual meeting.

The monitoring application may determine when to monitor for content item accesses by accessing the user's calendar data to determine when the user is attending a virtual meeting. When the user is attending a virtual meeting, the monitoring application may actively monitor for content item accesses, such as viewing or editing documents stored locally, viewing or editing documents stored within a content management system, and viewing webpages on a web browser.

The monitoring application may display a notification on the user's personal computing device that indicates that a content item will be associated with the current virtual meeting. The notification may be an interactive notification that allows the user to undo the proposed content-item-to-virtual-meeting association if the content item is not relevant to the current virtual meeting.

The monitoring application may be configured to analyze post-meeting transcripts for keywords that may be related to relevant content items identified. When a relevant keyword is identified in the transcript, the monitoring application may update the content-item-to-virtual-meeting association data to include timestamps corresponding to when the keyword in the transcript occurred, thereby providing the user with additional context for when the content item may be relevant.

The monitoring application may generate additional notifications that present potential sharing suggestions to the user. In this context, sharing of a content item may represent either sharing access to a content item stored in a content management system or sharing a link to the content item. Sharing access to the content item may represent providing a user access to the content item stored within the content management system. Sharing a link to the content item may represent providing a reference to the location of the content item, such as a URL or an address to a content item stored in a remote location.

The monitoring application may generate notifications that present potential sharing suggestions based upon content items presented by a meeting presenter. If the user is a presenter and presents different content items during the virtual meeting, the monitoring application may suggest sharing the presented content items to the other virtual meeting attendees. In other instances, the monitoring application may access content-item-to-virtual-meeting association data generated by other instances of the monitoring application to determine whether multiple users accessed a content item during the virtual meeting. If multiple users accessed a content item, then the monitoring application may generate a sharing suggestion to share the content item with other users attending the virtual meeting who did not access the content item during the virtual meeting. The monitoring application may be configured to provide content item sharing suggestions if a majority of virtual meeting attendees or a percentage of attendees access a particular content item during the virtual meeting.

Additionally, the monitoring application may proactively generate content items and content-item-to-virtual-meeting association data in response to a virtual meeting participant sharing a link to the content item within the meeting presentation software. For example, a user may post a web link in a chat interface associated with the meeting presentation. In response to detecting a link in the chat interface, the monitoring application may generate or identify a content item represented by the link shared in the chat interface, and may generate content-item-to-virtual-meeting association data that associates the content item to the current virtual meeting. The monitoring software may share the newly generated content item with the other meeting participants.

Embodiments described herein improve the collection and organization of content items relevant to a virtual meeting by automatically monitoring when a user accesses content items during a virtual meeting. Embodiments improve the user experience by eliminating the need to manually keep track of content items accessed during a virtual meeting. Embodiments facilitate user collaboration by automatically suggesting and sharing relevant content items with fellow virtual meeting attendees.

System Overview

FIG. 1 is a block diagram that illustrates a system 100 for monitoring content items accessed during a virtual meeting and generating an association between the content items accessed during the virtual meeting and the virtual meeting. System 100 includes computing device 110, computing device 110-2, content management system 140, and network 105. Computing device 110-2 may represent a second computing device that is similar to computing device 110. For the purposes of clarity, applications and services implemented on computing device 110-2 have been omitted from FIG. 1. Although computing device 110 and computing device 110-2 are illustrated in FIG. 1, system 100 may include more or fewer computing devices. Similarly, system 100 may include more than one content management system.

In some embodiments, content management system 140 may represent one or more servers configured to store and manage content items for one or more users. Further details describing implementation of content management system 140 are described in the EXAMPLE CONTENT MANAGEMENT SYSTEM section herein.

In some embodiments, computing device 110 includes calendar application 112, virtual meeting application 114, operating system 116, web browser 118, monitoring application 120, and local storage 130. Calendar application 112 may represent a software application implemented to provide users with an electronic version of a calendar. Examples of calendar application 112 include Microsoft Outlook, browser based applications such as Google calendar, and any other type of a calendaring software. Calendar application 112 may send and receive meeting invitations and track multiple meetings and appointments for the user. Virtual meeting application 114 may represent software implemented to allow users to communicate and interact with each other during a virtual meeting over a network connection. Virtual meeting application 114 may be implemented to allow users to communicate via video conference, audio conference, and text chat. Operating system 116 may represent system software implemented to manage computer hardware and software resources for computing device 110. Examples of operating system 116 may include, but are not limited to Microsoft Windows, Apple's macOS and iOS, Linux, Unix, and any other commercially available operating system. Web browser 118 may represent an application implemented to access web pages and other documents on the World Wide Web. Examples of the web browser 118 may include, but are not limited to, Internet Explorer, Firefox, Google Chrome, Safari, and any other web browser application. Local storage 130 may represent any type of storage medium that is connected to computing device 110 and configured to store content items. Management and storage of content items within local storage 130 may be managed by the operating system 116 or any other content item storage application.

In some embodiments, monitoring application 120 may represent a software application implemented to monitor content items accessed by the user while the user is attending a virtual meeting. Monitoring application 120 may include authentication service 121, content item polling service 122, meeting tracking service 123, content item association service 124, notification generation service 125, user interface generation service 126, content item suggestion service 127, and sharing service 128.

In some embodiments, authentication service 121 may be implemented to facilitate authorization to access content item resources from various content management systems. In this context a content management system may represent an external or cloud based content management service such as Dropbox™. In another example, the content management system may represent a file management service implemented by an operating system such as Windows, MacOS, or iOS. Authentication service 121 may request authorization from the user to access content items associated with the user. For example, if content management system 140 represents Dropbox, then authentication service 121 may request that the user provide authorization by way of the user's login credentials so that authentication service 121 may request access to the user's endpoints. In some embodiments, authentication service 121 may prompt the user for their login credentials. In other embodiments, authentication service 121 may request login credentials from a content management system client running on computing device 110.

In some embodiments, authentication service 121 may implement various authorization protocols to receive authorization to monitor content items from file system endpoints associated with the user. Authentication service 121 may implement open authorization protocols such as OAuth 2.0 or any other authorization protocol. For example, upon receiving authorization from the user, authentication service 121 may request an access token from the content management system 140. Authentication service 121 may send a request for an access token to an authentication service running on the content management system 140 or an authentication server associated with the content management system 140. The authentication service may determine that the request from authentication service 121 is authorized and may issue an access token to authentication service 121. Upon receiving the access token, monitoring application 120 may request resources associated with the user using the access token.

In some embodiments, content item polling service 122 may be implemented to monitor file system endpoints to determine when a content item is accessed by the user. Content item polling service 122 may poll file system endpoints associated with the content management system 140, file system endpoints associated with computing device 110 and the file system managed by the operating system 116, and content items accessed or presented using the web browser 118. Polling intervals for polling file system endpoints may be configurable. For example, content item polling service 122 may be initially configured to poll file system endpoints every minute but may be modified to poll either more or less frequently.

In some embodiments, content item polling service 122 may poll for web browser activity by implementing a web browser plugin application that is configured to monitor content items, such as a webpages, accessed during a virtual meeting using the web browser 118. The web browser plugin application may be configured to periodically send all web traffic activity to content item polling service 122. Content item polling service 122 may receive the web traffic activity from the web browser plugin application and parse and identify content items accessed during the duration of the virtual meeting. In another embodiment, content item polling service 122 may be configured to monitor web traffic coming from computing device 110, by implementing a web proxy to analyze all web traffic to and from computing device 110. This implementation may be useful if the web browser 118 is not a conventional web browser that allows implementation of a plugin application.

Meeting tracking service 123 may be implemented to keep track of meetings that the user has been invited to attend and/or is planning to attend. In some embodiments, meeting tracking service 123 may request, from the calendar application 112, data describing the meeting invitations that the user has received and the start and end times for each meeting. Meeting tracking service 123 may then determine when content item polling service 122 should poll file system endpoints for instances of when content items are accessed by the user. For example, if the user is planning to attend a meeting from 11 AM to 12 PM, then meeting tracking service 123 may send a message to content item polling service 122 to begin polling file system endpoints during the meeting window of 11 AM to 12 PM.

In some embodiments, meeting tracking service 123 may be configured to instruct content item polling service 122 to begin polling at times corresponding to each meeting that the user has accepted. In another embodiment, meeting tracking service 123 may be configured to instruct content item polling service 122 to begin polling during times corresponding to meetings that the user has been invited to attend. In yet another embodiment, meeting tracking service 123 may be configured to instruct content item polling service 122 to begin polling only when the user is actively in a meeting. For example, meeting tracking service 123 may query the status of the virtual meeting application 114, using Application Programming Interfaces (APIs) provided by the virtual meeting application 114, to determine whether the user is actively attending a virtual meeting. If the user is actively attending the virtual meeting, then meeting tracking service 123 may be configured to instruct content item polling service 122 to start polling for user activity.

In some embodiments, content item association service 124 may be implemented to generate an association between a content item and a virtual meeting. For example, if content item polling service 122 is actively polling for content item accesses during a virtual meeting and identifies a content item, such as a document, that was accessed during the virtual meeting, content item polling service 122 may generate a data object representing an association between the accessed content item and an identifier used to identify the virtual meeting. In some embodiments, the data object may represent content-item-to-virtual-meeting association data that includes associating a content item file identifier to a virtual meeting event identifier. For example, the content item file identifier may be an operating system file identifier or a content management system identifier, such as a Dropbox file ID. The virtual meeting event identifier may represent a unique identifier used to uniquely identify the virtual meeting event. The content-item-to-virtual-meeting association data may also include one or more timestamps indicating when the content item was accessed by the user during the virtual meeting.

In some embodiments, content item association service 124 may store the generated data object in local storage 130 or within remote storage on a remote server, such as a storage server associated with the content management system 140. For example, content item association service 124 may store the generated data objects at a file system endpoint associated with the user within the content management system 140. By storing the data objects within the content management system 140, a user using multiple computing devices 110 and 110-2 may monitor content item access activity on each of the multiple computing devices 110 and 110-2. Each instance of content item association service 124 executing on computing devices 110 and 110-2 may store data objects in a single location. By doing so, the monitoring application may aggregate activity monitoring across multiple devices used by the user.

In some embodiments, content item association service 124 may use hashing to mask the content item file identifier in the content-item-to-virtual-meeting association data in order to protect the user's access history from others. For example, if the content-item-to-virtual-meeting association data is stored in a remote location that is accessible by multiple users, then it would be beneficial to conceal the file identifier of the content item in order to protect the user's content item access history.

Upon generating the association between the content item and the virtual meeting, content item association service 124 may make a request to notification generation service 125 to generate a notification that informs the user of the newly generated association. In another embodiment, prior to generating the association between the content item and the virtual meeting, content item association service 124 may make a request to notification generation service 125 to generate a notification that informs the user of a potential association between the content item and the virtual meeting.

In some embodiments, notification generation service 125 may be implemented to generate a notification that notifies the user of a potential association between a content item recently accessed and the virtual meeting taking place concurrently. The notification may be in the form of a popup notification that displays the name of the content item accessed during the virtual meeting. Additionally, the popup notification may include one or more interactive buttons that allow the user to undo the proposed association between the content item and the virtual meeting, mute subsequent notification messages from being displayed, and a button to pause active monitoring of content items. The "undo association" functionality allows the user to control which content items are associated with the virtual meeting. For instance, if user is attending a meeting on security protocols at work and content item polling service 122 identifies that the user accessed a football scores webpage, and content item association service 124 generated an association between the football scores webpage and the security protocols virtual meeting, then the user may click the undo association button in the generated notification to remove the association between the football scores webpage and the security protocols virtual meeting as this content item is not relevant to the virtual meeting.

In some embodiments, notification generation service 125 may also generate notifications related to providing content item sharing suggestions. For example, if monitoring application 120 determines that a content item accessed by one or more users during the meeting, notification generation service 125 may generate a notification that suggests and/or gives an option to the user to share the content item with other meeting participants.

In some embodiments, user interface generation service 126 may be implemented to generate a graphical user interface that the user may interact with to view content-item-to-virtual-meeting associations for various virtual meetings, edit lists of content-item-to-virtual-meeting associations, generate new content-item-to-virtual-meeting associations, and to share content items with other meeting participants. Further details of the graphical user interface are described in the GRAPHICAL USER INTERFACE section herein.

In some embodiments, content item suggestion service 127 may be implemented to identify content items that may be beneficial to share with other users attending the virtual meeting. For example, if the virtual meeting is about security protocols at work and a user is accessing a content item containing the current security protocols, content item suggestion service 127 may suggest, using a notification message, that the user share the content item containing the current security protocols with other users in the virtual meeting. In some embodiments, content item suggestion service 127 may identify a content item for sharing based upon multiple virtual meeting attendees accessing the same content item during the virtual meeting. For instance, if two or more users access the content item during the meeting, then content item suggestion service 127 may suggest that the user share the content item with other meeting participants. In another example, content item suggestion service 127 may be configured to make the sharing suggestion only after a certain number of meeting participants access the content item. For instance, content item suggestion service 127 may be configured to make the sharing suggestion after a quorum of users access the content item, or after a certain percentage of users access the content item.

In some embodiments, sharing service 128 may be implemented to share content items with other users participating in the virtual meeting. Sharing service 128 may be implemented to share content items managed by the content management system 140 using API commands to invoke sharing actions on behalf of the content management system 140. In another embodiment, if the content item is stored locally on the user's computing device 110, sharing service 128 may then copy and store the content item within the content management system 140 and then share the content item with target users using available API commands for the content management system 140. In other examples, sharing service 128 may share webpage links with other users by sending a notification, an email, a text message, or any other notification to the target users. Additionally, sharing service 128 may share links to content items with other users by presenting links to the content items in a chat interface provided by virtual meeting application 114 or any other chat interface used by users.

Example Content Management System

Figure 2:
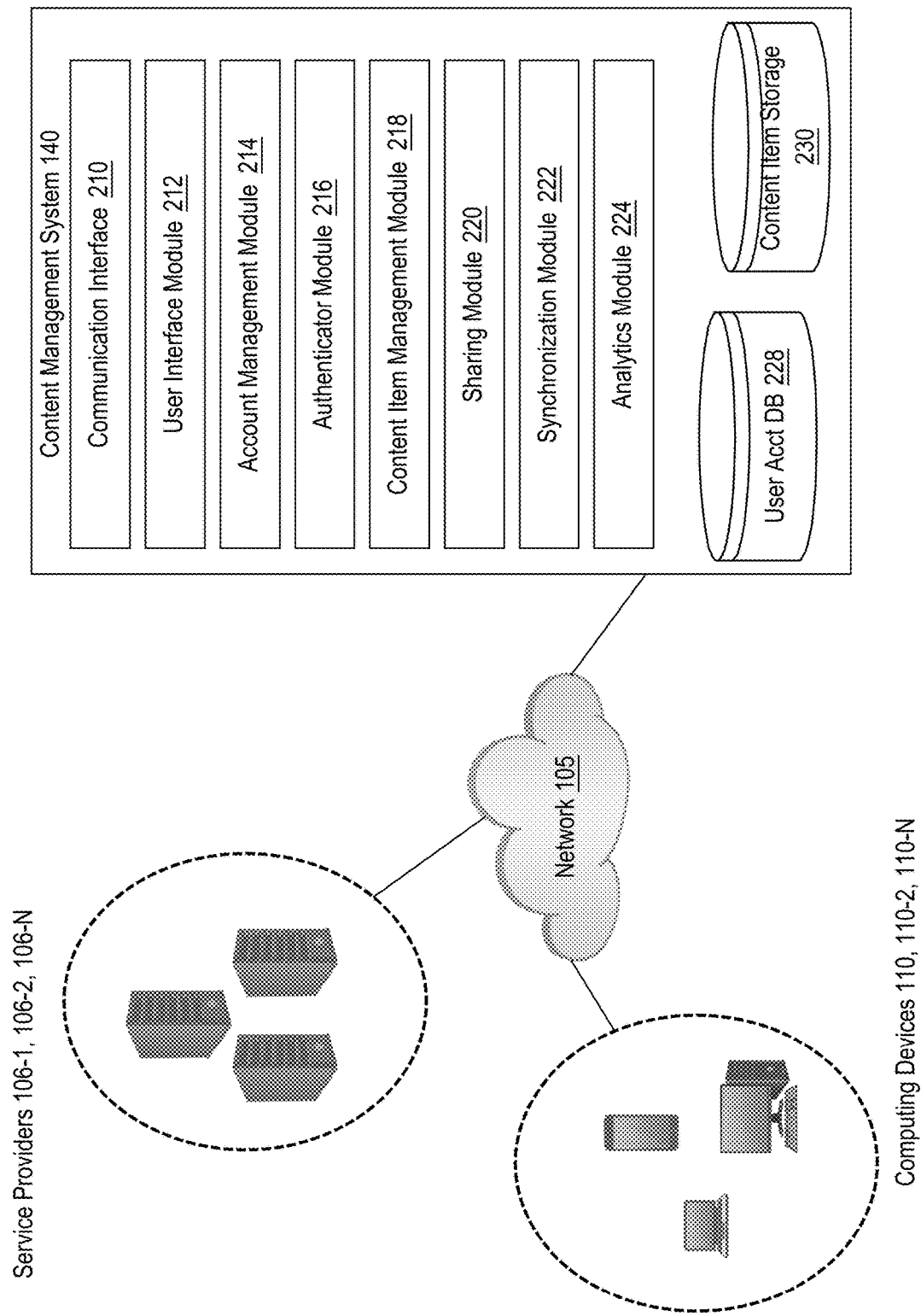
FIG. 2 illustrates a content management system, in accordance with one or more example implementations.

With respect to implementing various embodiments of the disclosed technology, a detailed example of the content management system 140 is shown in FIG. 2. Content management system 140 can be configured for use on network 105. Network 105 may represent the Internet or other wide-area data communications network, for example. However, the disclosed techniques can be implemented in a variety of network configurations that facilitate the intercommunication of electronic devices via a wired or wireless data communications network. For example, while network 105 can be the Internet where content management system 140 is implemented as a "cloud" computing service, network 105 can be a local wireless area network or other type of local area network within a home or office, for example, where content management system 140 is a computing appliance within the home or office. Although not shown in FIG. 2, a computing device 110 may communicate with content management system 140 via a different data communications network than a service provider 206. For example, a computing device 110 may communicate with content management system 140 via a local area network and a service provider 206 may communicate with content management system 140 via the Internet.

In FIG. 2, a user can interact with content management system 140 through computing device 110 connected to network 105. Content management system 140 can be implemented with a single computing device (e.g., a server) or with multiple computing devices (e.g., multiple servers) that are configured to perform the functions or operations described herein. Content management system 140 can support connections from a variety of different types of client device, including, but not limited to, a desktop computer, a mobile computer, a mobile communications device, a mobile phone, a smart phone, a tablet computer, a smart television, a set-top box, or any other data communications network-enabled computing device. Computing device 110 can be of varying type and capability and be configured with a varying type of operating system (e.g., a UNIX-based or a WINDOWS-based operating system). Furthermore, content management system 140 can concurrently accept network connections from and concurrently interact with multiple computing devices 110, 110-2 . . . 110-N.

A user can interact with content management system 140 via a client-side application installed on computing device 110. The client-side application can include a content management system specific component. For example, the component can be a stand-alone application, one or more application plug-ins, or a web browser extension. However, the user can also interact with content management system 140 via a third-party application, such as a web browser, that is installed and executes on computing device 110 and is configured to communicate with content management system 140. In either case, the client-side application can present a graphical user interface (GUI) for the user to interact with content management system 140. For example, the user can interact with the content management system 140 via a client-side application integrated with the file system or via a webpage displayed using a web browser application.

Content management system 140 can enable a user to store content items as well as perform a variety of content management tasks, such as retrieve, modify, browse, or share the content items. Furthermore, content management system 140 can enable a user to access content items from multiple computing devices 110, 110-2 . . . 110-N. For example, a computing device 110 can upload a content item to content management system 140 via network 105. Later, the same computing device 110 or some other computing device 110-2 can retrieve the content item from content management system 140.

To facilitate the various content management services, a user can create an account with content management system 140. User account database 228 can maintain the account information. User account database 228 can store profile information for a registered user. For example, the profile information may include a username or email address for the registered user. However, content management system 140 can also be configured to accept additional user information such as birthday, address, billing information, etc.

User account database 228 can include account management information, such as account type (e.g., free or paid), usage information, (e.g., content item viewing, editing, and sharing history), maximum content item storage space authorized, content item storage space used, content item storage locations, security settings, personal configuration settings, content item sharing data, etc. Account management module 214 can be configured to update or obtain user account details in user account database 228. The account management module 214 can be configured to interact with any number of other modules in content management system 140.

An account can be used to store content items, such as digital data, documents, text files, audio files, video files, cloud documents, etc., from one or more client devices 102 authorized on the account. The content items can also include collections for grouping content items together with different behaviors, such as folders, playlists, albums, etc. For example, an account can include a public folder that is accessible to any user. The public folder can be assigned a web-accessible address. A unique link (e.g., a unique Uniform Resource Locator (URL)) to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content item storage 230. Content item storage 230 can be a storage device, multiple storage devices, or a server. Alternatively, content item storage 230 can be a cloud storage provider or network storage accessible via a data communications network. Content management system 140 can hide the complexity and details from client devices 102 so that client devices 102 do not need to know exactly where or how the content items are being stored by content management system 140. For example, content management system 140 can store the content items in the same collection hierarchy as they appear on a computing device 110. However, content management system 140 can store the content items in its own order, arrangement, or hierarchy. Content management system 140 can store the content items in a network accessible storage (NAS) device, in a redundant array of independent disks (RAID), etc. Content item storage 230 can store content items using one or more partition types, such as FAT, FAT32, NTFS, EXT2, EXT3, EXT4, HFS/HFS+, BTRFS, and so forth.

Content item storage 230 can also store metadata describing content items, content item types, and the relationship of content items to various accounts, collections, or groups. The metadata for a content item can be stored as part of the content item or can be stored separately. In an implementation, each content item stored in content item storage 230 may be assigned a system-wide unique identifier.

Content item storage 230 can decrease the amount of storage space required by identifying duplicate content items or duplicate segments or blocks of content items. Instead of storing multiple copies of the duplicate content items, segments, or blocks, content item storage 230 can store a single copy and then use a pointer or other mechanism to link the duplicates to the single copy. Similarly, content item storage 230 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 140 can be configured to support automatic synchronization of content items from a computing device 110. The synchronization can be platform agnostic. That is, the content items can be synchronized with a computing device 110 without requiring a particular type, capability, or operating system of computing device 110. For example, a computing device 110 can include client software, which synchronizes, via synchronization module 222 at content management system 140, content items stored in at a computing device 110's file system with the content items in an associated user account. In some cases, the client software can synchronize any changes to content items in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 140. Conversely, the background process can identify content items that have been updated at content management system 140 and synchronize those changes to the local collection. The client software can provide notifications of synchronization operations and can provide indications of content statuses directly within the content management application. Sometimes a computing device 110 may not have a network connection available. In this scenario, the client software can monitor the linked collection for content item changes and queue those changes for later synchronization to content management system 140 when a network connection is available. Similarly, a user can manually start, stop, pause, or resume synchronization with content management system 140.

A user can view or manipulate a content item via a web interface generated and served by user interface module 212. For example, the user can navigate in a web browser to a web address provided by content management system 140. Changes or updates to the content item in the content item storage 230 made through the web interface, such as uploading a new version of the content item, can be propagated back to another computing device 110 associated with the user's account. For example, multiple client devices 102, each with their own client software, can be associated with a single account and content items in the account can be synchronized between each of the multiple client devices 102.

Content management system 140 can include a communications interface 210 for interfacing with a computing device 110 and can interact with a service provider 106 via an API. Certain software applications can access content item storage 230 via an API on behalf of a user. For example, a software package, such as an app running on a smartphone or tablet computing device, can programmatically make calls directly to content management system 140, when a user provides credentials, to read, write, create, delete, share, or otherwise manipulate a content item. Similarly, the API can allow a user to access all or part of content item storage 230 through a web site.

Content management system 140 can also include authenticator module 216, which can verify user credentials (e.g., a username and password), a security token, an API call, a client device, and so forth, to ensure only an authorized client and user can access a content item. In an implementation, authenticator module 216 authorizes a user to interact with content management system 140 based on user credentials the user keeps with a service provider 106 without the user having to provide the user credentials to content management system 140 using an industry-standard delegated authorization framework such as Open ID Connect (OIDC), OAuth 2.0, or the like.

Content management system 140 can include analytics module 224 module that can track and report on aggregate file operations, user actions, network usage, total content item storage space used, as well as other technology, usage, or business metrics. A privacy or security policy can prevent unauthorized access to user data stored with content management system 140.

Content management system 140 can include sharing module 220 for managing sharing a content item publicly or privately. Sharing content publicly can include making the content item accessible from any computing device in network communication with content management system 140. Sharing content privately can include linking the content item in content item storage 230 with two or more user accounts so that each user account has access to the content item. The sharing of the content item can be performed in a platform agnostic manner. That is, the content item can be shared with a computing device 110 with requiring computing device 110 to be a particular type, to have a particular capability, or be configured with a particular operating system. The content item can also be shared across varying types of user accounts including individual, personal, group, or team accounts.

Content management system 140 can be configured to maintain a content item directory identifying a location of each content item in content item storage 230. The content item directory can include a unique content item entry for each content item stored in content item storage 230. A content item entry can include a content item path that can be used to identify a location of a content item in content item storage 230 or at a computing device 110. For example, the content path can include the name of the content item and a folder hierarchy associated with the content item. For example, the content item path can include a folder or path of folders in which the content item is placed as well as the name of the content item. Content management system 140 can use the content item path to present the content item in the appropriate folder hierarchy. A content item entry can also include a content item pointer that identifies a location of the content item in content item storage 230. For example, the content pointer can include a storage address of the content item in non-transitory computer-readable media. The content item pointer can point to multiple locations in content item storage 230, each of which contains a portion (e.g., a block or segment) of the content item.

In addition to a content item path and a content item pointer, a content item entry can also include a user account identifier that identifies the user account that has access to the content item. Multiple user account identifiers can be associated with a single content item entry indicating that the content item has shared access by the multiple user accounts.

To share a content item privately, sharing module 220 can be configured to add a user account identifier to the content item entry associated with the content item, thus granting the added user account access to the content item. Sharing module 220 can also be configured to remove user account identifiers from a content item entry to restrict a user account's access to the content item. The user account identifier in a content item entry may also be associated with an access permission indicating a type of access that the user account has to the corresponding content item. A content item entry may contain multiple different access permissions associated with a user account identifier depending on the access permissions the user account is granted with respect to the content item. Non-limiting examples of access permissions that may be associated with a user account identifier in a content item entry include view, edit, delete, share, download, etc.

To share content publicly, sharing module 220 can be configured to generate a unique link, such as a unique uniform resource locator (URL), which allows a web browser or other client application to access the content item in content management system 140 without an authentication. To accomplish this, sharing module 220 can be configured to include content item identification data in the generated unique link, which can later be used to properly identify and return the requested content item. For example, sharing module 220 can be configured to include the user account identifier and the content path in the generated unique link. Upon selection of the unique link, the content item identification data included in the unique link can be transmitted to content management system 140 which can use the received content item identification data to identify the appropriate content item entry and return the content item associated with the content item entry.

In addition to generating the unique link, sharing module 220 can also be configured to record that unique link to the content item has been created. The content item entry associated with a content item can include a unique link flag indicating whether a unique link to the content item has been created. For example, the unique link flag can be a Boolean value initially set to 0 or false to indicate that a unique link to the content item has not been created. Sharing module 220 can be configured to change the value of the flag to 1 or true after generating a unique link to the content item.

Sharing module 220 can also be configured to deactivate a generated unique link. For example, each content item entry can also include a unique link active flag indicating whether the content item should be returned in response to a request from the generated unique link. For example, sharing module 220 can be configured to only return a content item requested by a generated link if the unique link active flag is set to 1 or true. Thus, access to a content item for which a unique link has been generated can be easily restricted by changing the value of the unique link active flag. This allows a user to restrict access to the shared content item without having to move the content item or delete the generated unique link. Likewise, sharing module 220 can reactivate the unique link by again changing the value of the unique link active flag to 1 or true. A user can thus easily restore access to the content item without the need to generate a new unique link.

While content management system 140 is presented with specific components, it should be understood by one skilled in the art, that the architectural configuration of system presented in FIG. 2 is simply one possible configuration and that other configurations with more or fewer components are possible.

Reference herein to "hosting" a content item with content management system 140 encompasses a user using content management system 140 to bring the content item under management of the content management system 140. For example, a content item that a user hosts with the content management system 140 may be one that the user uploads, synchronizes, or otherwise provides to the content management system 140. When a content item is hosted with the content management system 140, a digital copy or digital representation of the content item is stored in content item storage 230 either as a file, a set of one or more blocks or segments, or in other suitable data storage form.

Example Content-Item-to-Virtual-Meeting Association Process

Figure 3:
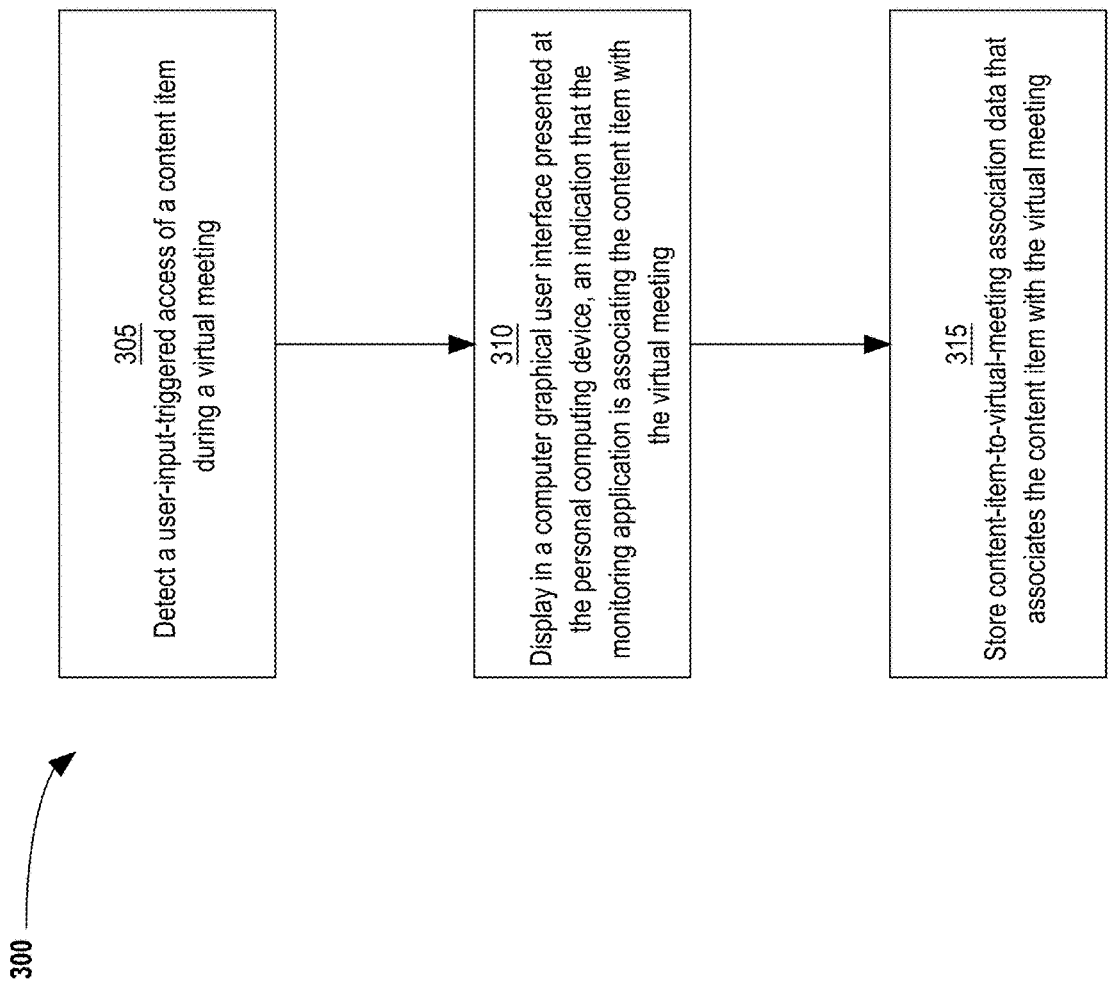
FIG. 3 illustrates a flowchart of a process for associating a content item to a virtual meeting based upon user-input-triggered access of the content item during the virtual meeting, in accordance with one or more example implementations.

FIG. 3 illustrates a flowchart of a process for associating a content item to a virtual meeting based upon user-input-triggered access of the content item during the virtual meeting. Process 300 may be performed by a single program or multiple programs. The operations of the process as shown in FIG. 3 may be implemented using processor-executable instructions that are stored in computer memory. For the purposes of providing a clear example, the operations of FIG. 3 are described as performed by components of FIG. 1. For the purposes of clarity, process 300 is described in terms of a single entity.

Prior to performing the operations described in FIG. 3, monitoring application 120 has been granted authorization, by the user, to access content items and content item activity within the content management system 140, the operating system 116 of computing device 110, calendar data from the calendar application 112, and web activity data from the web browser 118. In operation 305, process 300 detects a user-input-triggered access of a content item during a virtual meeting. In some embodiments, the virtual meeting may be presented within a virtual meeting application executing on computing device 110. For example, the virtual meeting application executing on computing device 110 may represent an instance of Zoom™, Cisco WebEx™, Microsoft Teams™, or any other virtual meeting software. In some embodiments, the user-input-triggered access of the content item may represent the user interacting with the content item in a content-accessing application executing on computing device 110. Examples of a content-accessing application may include, but are not limited to, a document editor such as Microsoft Word™, Microsoft Office™, Wordpad™, a file viewer application, a web browser, or any other program configured to view or edit documents.

In some embodiments, user-input-triggered access of a content item may also include the user clicking on a link to the content item. For example, the virtual meeting application may be enabled with a chat interface for users to exchange messages during the virtual meeting. The user-input-triggered access may represent when the user clicks on a link to a webpage presented in the virtual meeting application chat box.

In some embodiments, user-input-triggered access of a content item may also include shared links, such as URL links or a link to a content item stored within content management system 140, that are shared via a chat interface associated with virtual meeting application 114. For example, if a first user shares a URL or a link to a content item within the chat interface, then monitoring application 120, running on a computing device of a second user, may detect and identify the shared URL or shared link as a potential content item that the second user deems relevant to the virtual meeting. Monitoring application 120 may be configured to track all links posted in the chat interface as potentially relevant content items.

In some embodiments, detection of the user-input-triggered access of the content item occurs when meeting tracking service 123 accesses calendar data for the virtual meeting from the calendar application 112. The calendar data may include a start time and end time for the virtual meeting. Meeting tracking service 123 determines a meeting time window for the virtual meeting. The meeting time window is used by content item polling service 122 to determine when to poll for content item activity that may be associated with the virtual meeting. During the time window, content item polling service 122 polls for user activity on content items. For example, during the time window content item polling service 122 monitors user activity to determine when the user accesses a content item, such as view or editing a document, viewing a webpage, or creating a new document. If content item polling service 122 identifies user activity on a content item, content item polling service 122 tags the activity as user-input-triggered access on the content item.

Figure 4:
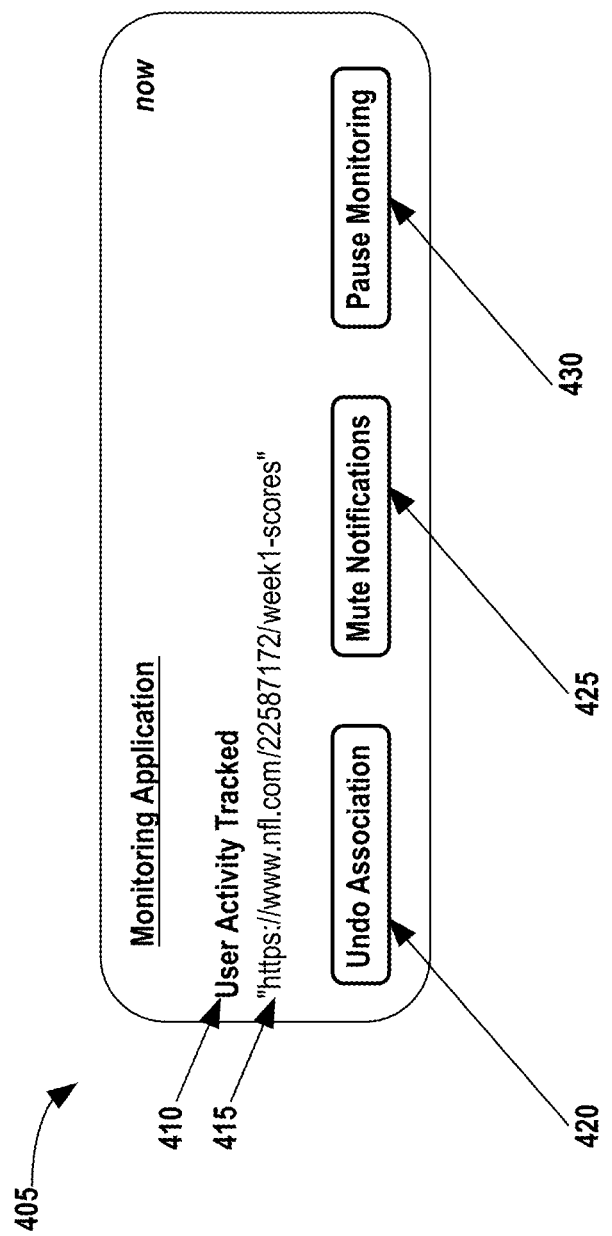
FIG. 4 illustrates an example graphical user interface for a notification of a user-input-triggered access of a content item, in accordance with one or more example implementations.

In operation 310, process 300, in response to detecting the user-input-triggered access of the content item, displays, in a computer graphical user interface presented at computing device 110, an indication that monitoring application 120 is associating the content item with the virtual meeting. In some embodiments, notification generation service 125 generates a notification that is displayed, within a graphical user interface, on computing device 110. An example of the notification is illustrated in FIG. 4. Notification 405 represents an example notification of the user-input-triggered access of the content item. Text 410, "user activity tracked" indicates to the user that the user activity on the content item is being tracked. Text 415 represents the name of the content item. In this example the content item is the webpage www.nfl.com/22587172/week1-scores.

In some embodiments, the notification may contain one or more interactive buttons that allow the user to perform actions related to the content item and the monitoring of future user-input-triggered access of content items. Button 420 represents an "undo association" button that is configured to undo the proposed association between the content item and the virtual meeting. For example, if during the virtual meeting the users checks football scores and the monitoring application identifies the user accessing NFL.com, then the user may select button 420 in notification 405 to undo the association between the NFL.com content item and the current virtual meeting. Button 425 represents a button to mute the display of notifications during the virtual meeting. If the user selects button 425, then notification generation service 125 will not display any future notifications on computing device 110. Button 430 represents a button to pause monitoring for user-input-triggered access of content items during the virtual meeting. When button 430 is pressed content item polling service 122 may pause its monitoring of access of content items by the user for the duration of the virtual meeting. If monitoring has already been paused, then pressing button 430 again may resume monitoring. That is, button 430 may be used as a pause/resume toggle switch for pausing and resuming monitoring of content items.

In operation 315, process 300 stores content-item-to-virtual-meeting association data that associates the content item with the virtual meeting. In some embodiments, content item association service 124 generates the content-item-to-virtual-meeting association data that includes associating a content item file ID to a virtual meeting event ID. The content item file ID may be an operating system file ID, content management system file ID such as a Dropbox file ID, or any other identifier used to uniquely identify the content item. The virtual meeting event ID is a unique identifier used to uniquely identify the virtual meeting event. In some embodiments, the content-item-to-virtual-meeting association data may include content item metadata that describes the file type of the content item, a timestamp indicating when the content item was accessed by the user, and any other file metadata.

In some embodiments, upon generating the content-item-to-virtual-meeting association data, content item association service 124 stores the corresponding association data either locally in local storage 130 or in a remote location, such as the content item storage 230 on the content management system 140.

In some embodiments, by storing the content-item-to-virtual-meeting association data in a remote location, content item association service 124 may aggregate content-item-to-virtual-meeting association data generated from multiple instances of monitoring application 120 running on computing device 110 and computing device 110-2. For example, if computing device 110 represents the user's laptop and computing device 110-2 represents the user's smartphone and each computing device has an implementation of monitoring application 120 running on it, then the monitoring applications 120 may be able to monitor any user activity across the user's multiple devices by storing all content-item-to-virtual-meeting association data in a single remote location that is accessible by either instance of monitoring application 120 running on either computing device 110 or computing device 110-2.

Post Virtual Meeting Activity

Upon completion of the virtual meeting, monitoring application 120 may analyze a transcript of the virtual meeting, produced by the virtual meeting application, for relevant keywords related to the content item. For example, if the content item is a document describing Open Authorization (OAuth), the monitoring application may analyze the transcript for any keywords related to OAuth and/or Open Authorization. When monitoring application 120 finds relevant keywords related to the content item, monitoring application 120 may capture timestamps of when the relevant keywords appeared in the transcript. Monitoring application 120 may update the content-item-to-virtual-meeting association data to include the timestamps related to when the relevant keywords appeared in the transcript.

In some embodiments, after monitoring application 120 updates the content-item-to-virtual-meeting association data to include the timestamps related to when the relevant keywords appeared in the transcript, monitoring application 120 may present a notification to the user with an option to share the updated content-item-to-virtual-meeting association data with other users who attended the virtual meeting.

In some embodiments, upon completion of the virtual meeting, the monitoring application may present a notification to the user with an option to share all content-item-to-virtual-meeting association data from the virtual meeting with all virtual meeting invitees, including invitees who did not attend the meeting. This feature may be especially useful for users who attend a reoccurring meeting but could not attend one specific meeting. The sharing option would allow the missing users to catch up on the subject matter discussed by viewing content items interacted with during the meeting.

Graphical User Interface

Figure 6:
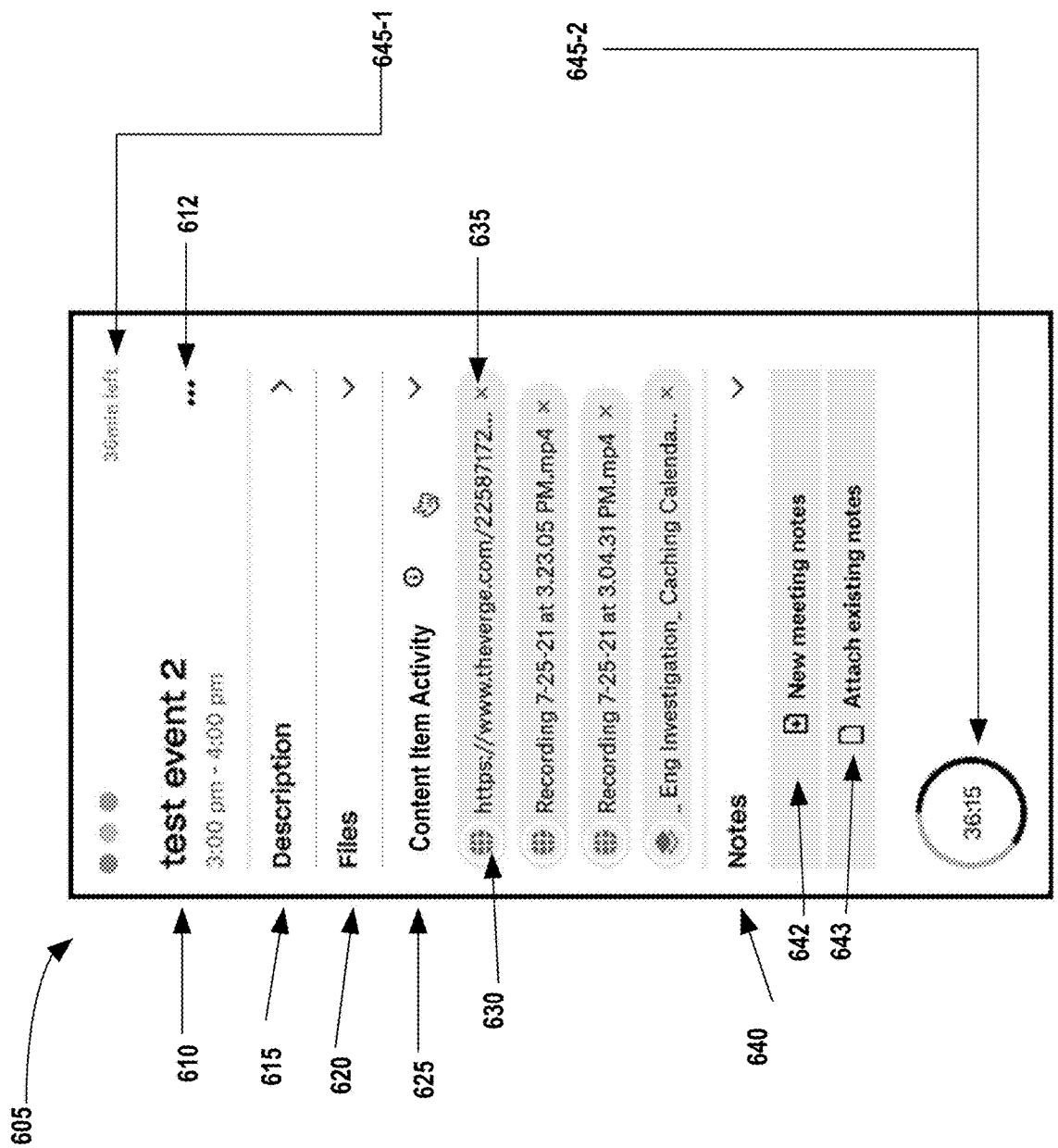
FIG. 6 illustrates an example graphical user interface for viewing and editing lists of content-item-to-virtual-meeting associations, in accordance with one or more example implementations.

FIG. 6 illustrates an example graphic user interface for viewing and editing lists of content-item-to-virtual-meeting associations, in accordance with one or more example implementations. Graphical user interface 605 represents an embodiment of the graphical user interface generated by user interface generation service 126. Graphical user interface 605 may be opened by clicking on monitoring application 120 icon located on the menu bar (MacOS) or the system tray (Windows) of computing device 110. The graphical user interface 605 represents a view of a virtual meeting and its content-item-to-virtual-meeting association data. If there are multiple virtual meetings saved, then the graphical user interface may present a list of available virtual meetings. Upon clicking on a virtual meeting from the list, the graphical user interface may display a virtual meeting specific view, as illustrated by graphical user interface 605.

Meeting title 610 represents a textual description of the virtual meeting that includes the virtual meeting name and the start and end time of the virtual meeting. Description 615 represents a clickable link to view a textual description of the virtual meeting from the meeting invitation. File link 620 is a clickable link to view content items that were attached to the meeting invitation. Content item activity 625 represents a clickable dropdown list that displays the content-item-to-virtual-meeting associations that were generated during the meeting. Content item 630 represents an example content-item-to-virtual-meeting association created during the meeting. A user may delete the association by clicking on the "X" icon 635. The user may also manually edit the display order of the content items by selecting and dragging a content item to a different position in the list. For example, the user may move content item 630 to the bottom of the list by selecting content item 630 and dragging content item 630 to the bottom of the list. In some embodiments, the order in which content items are displayed may be modified by selecting options icon 612. For example, the list of content items may be sorted either in descending order by timestamp, by grouping and sorting content items based on file type, by grouping and sorting content items together based the type of access activity such as web activity versus file access activity, or by any other grouping and sorting criteria.

Notes 640 represent a section where the user may add notes about the virtual meeting and the content-item-to-virtual-meeting association data. For example, if the user accessed multiple instructional videos during the virtual meeting and wanted to make a note to revisit the instructional videos at a later time, the user may click on new meeting notes icon 642 to add notes to the virtual meeting. If the user wanted to attach a file as a note to the virtual meeting, then the user may select the attach meeting notes icon 643 to attach the file as a note. Meeting status indicators 645-1, 645-2 represent indicators that display the amount of time left in the virtual meeting. Graphical user interface 605 illustrates two examples of the meeting status indicator, meeting status indicator 645-1 displays the time left in the meeting in textual format as "36 min left". Meeting status indicator 645-2 displays the time left in the meeting in a graphical format using a multi-colored circle with a textual meeting time displaying the minutes and seconds left in the meeting as MM: SS. If a user accessed graphical user interface 605 after the meeting has ended, then meeting status indicators 645-1, 645-2 may indicate that the meeting has ended using text such as "0 min left", "meeting has ended", or any other text stating that the meeting is over. Additionally, meeting status indicators 645-1, 645-2 may incorporate graphical indicators to indicate that the meeting is over, such as greyed out and/or italicized text stating "meeting ended" or any other graphical indicator that shows the meeting is over.

In some embodiments, a user may manually add content items to the list of content-item-to-virtual-meeting association data without explicitly accessing the content item by selecting the content item icon and dragging the selected content item icon to monitoring application 120 icon located in either the menu bar or system tray. By dragging and dropping the content item icon onto monitoring application 120 icon, the monitoring application will associate the content item to the ongoing virtual meeting. For example, if the user was attending a virtual meeting on internet security and the user had a document, which listed all the approve antivirus software, on their desktop, the user may manually associate the document to the virtual meeting by dragging and dropping the document icon from the desktop to monitoring application 120 icon.

Example Content Item Sharing Process

Figure 5:
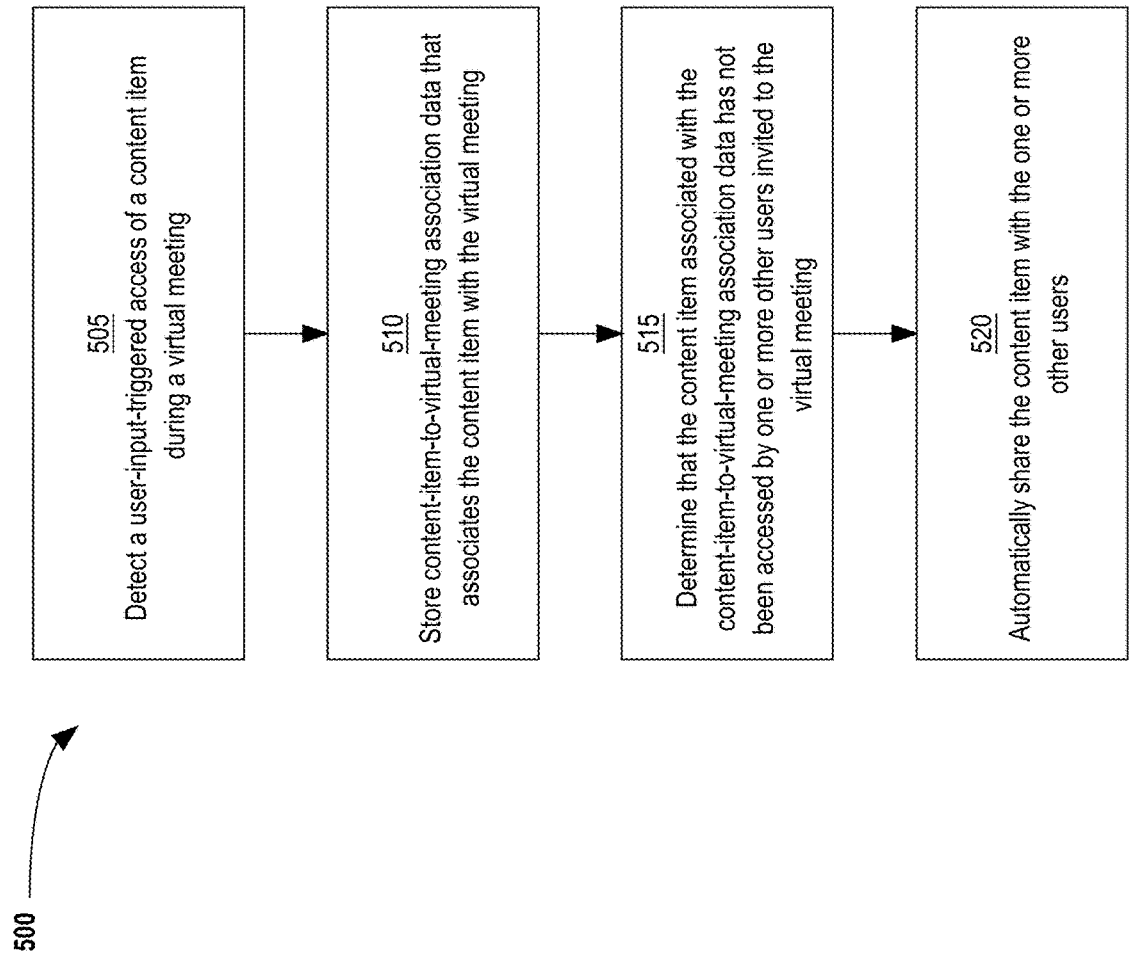
FIG. 5 illustrates a flowchart of a process for sharing content items with other users invited to a virtual meeting, in accordance with one or more example implementations.

FIG. 5 includes a flowchart of a process for sharing content items with other users invited to a virtual meeting. Process 500 may be performed by a single program or multiple programs. The operations of the process as shown in FIG. 5 may be implemented using processor-executable instructions that are stored in computer memory. For the purposes of providing a clear example, the operations of FIG. 5 are described as performed by components of FIG. 1. For the purposes of clarity, process 500 is described in terms of a single entity.

In operation 505, process 500 detects a user-input-triggered access of a content item during a virtual meeting. In some embodiments, the virtual meeting may be presented within a virtual meeting application executing on computing device 110. The user-input-triggered access of the content item may represent the user interacting with the content item in a content-accessing application, such as a document editor, document viewer, or a web browser, executing on computing device 110. In some embodiments, detection of the user-input-triggered access of the content item occurs when meeting tracking service 123 accesses calendar data, including the start and end times, for the virtual meeting from the calendar application 112. Meeting tracking service 123 determines a meeting time window for the virtual meeting and instructs content item polling service 122 to poll for content item activity that may be associated with the virtual meeting. If content item polling service 122 identifies user activity on a content item, content item polling service 122 tags the activity as user-input-triggered access on the content item.

In operation 510, process 500 stores content-item-to-virtual-meeting association data that associates the content item with the virtual meeting. In some embodiments, content item association service 124 generates the content-item-to-virtual-meeting association data that includes associating a content item file ID to a virtual meeting event ID. Content item association service 124 stores the corresponding content-item-to-virtual-meeting association data in a remote location, such as the content item storage 230 on the content management system 140.

In operation 515, process 500 determines that the content item associated with the content-item-to-virtual-meeting association data has not been accessed by one or more other users invited to the virtual meeting. In some embodiments, monitoring application 120 may be configured to access storage locations, where the content-item-to-virtual-meeting association data for each meeting attendee is stored, to determine which users in the virtual meeting accessed the content item. If each of the users in the virtual meeting accessed the content item, then there would be no reason to share the content item with the other users. If however, one or more other users from the virtual meeting have not accessed the content item, then it may be beneficial to share the content item with the other users. For example, if two users collaborated on a content item during the meeting, then the content item may be relevant to the meeting and other meeting participants may benefit from the content item being shared. Monitoring application 120 may determine collaboration on a content item by users based upon whether the users access the content item during the meeting.

In another embodiment, criteria for determining whether to share a content item with other users in the virtual meeting may be based on the number of users who accessed the content item during the meeting. For example, if two or more users accessed the content item during the virtual meeting, then the content item may be relevant to the virtual meeting and should be shared with the other users. Monitoring application 120 may be configured to access storage locations, where the content-item-to-virtual-meeting association data for each meeting attendee is stored, to determine whether two or more users accessed the content item during the meeting. If two or more users accessed the content item then monitoring application 120 may determine that the content item should be shared with the other users. In yet another embodiment, the threshold for determining whether to share the content item may be based on whether a quorum of users accessed the content item during the meeting. The threshold may be based on any percentage of users who access the content item during the meeting.

In yet another embodiment, criteria for determining whether to share a content item with other users in the virtual meeting may also be based on whether the virtual meeting is a reoccurring meeting, as well as a threshold number of users accessing the content item during the meeting. For instance, if the meeting is a reoccurring meeting with the same number of invitees, sharing content items accessed during the virtual meeting with invitees who did not attend the current virtual meeting would be beneficial to the missing invitees.

In yet another embodiment, criteria for determining whether to share a content item with other users in the virtual meeting may be based on whether the user is the host or presented material during the virtual meeting. For example, if the user shared their desktop during the meeting and accessed a content item during the sharing session, then the monitoring application may determine that the content item accessed while the user was sharing their desktop should be shared to the other one or more users.

Referring back to FIG. 5, in operation 520, process 500 automatically shares the content item with the one or more other users. In some embodiments, monitoring application 120, upon determining in operation 515 to share the content item with the one or more other users, sharing service 128 may automatically generate and send a share request to share the content item with the one or more other users. The share request may be sent at the conclusion of the virtual meeting. Alternatively, the share request may be sent during the virtual meeting. In some embodiment, monitoring application 120 may share the content item with the one or more other users by posting a link to the content item within the chat interface of virtual meeting application 114.

In another embodiment, prior to sending the share request, notification generation service 125 may notify the user that monitoring application 120 is planning to send a share request to the one or more other users. The share notification may include one or more interactive buttons that allow the user to either delay the share request, cancel the share request, or immediately send the share request without waiting until the end of the meeting.

In another embodiment, if the one or more other users already has access to the content item prior to sending a share request from the user, monitoring application 120 on computing device 110 may communicate to other instances of the monitoring application running on computing devices belonging to the one or more other users to inform the other instances of the monitoring application that monitoring application 120 identified a content item that the one or more other users should access. In response to receiving the communication, the other instances of the monitoring application may display a notification that the one or more other users should access the content item because other virtual meeting attendees are accessing the content item.

In some embodiments, monitoring application 120 may be configured to detect when a first user shares a link to a content item with one or more other users during the meeting. For example, the first user may send a link to a content item to a second user attending the meeting. Monitoring application 120 may identify that one or more other users attending the meeting did not receive the link to the content item from the first user. Monitoring application 120 may then generate a notification that suggests that the first user share the link to the content item with the one or more other users. Additionally, monitoring application 120 may be configured to only generate a notification for sharing the content item and/or link to the content item with the one or more other users if both the first user and the second user accessed the content item during the meeting. By only identifying shared content items that are collaboratively accessed during the meeting, monitoring application 120 may selectively generate suggestions for sharing content items that seem relevant to the meeting.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
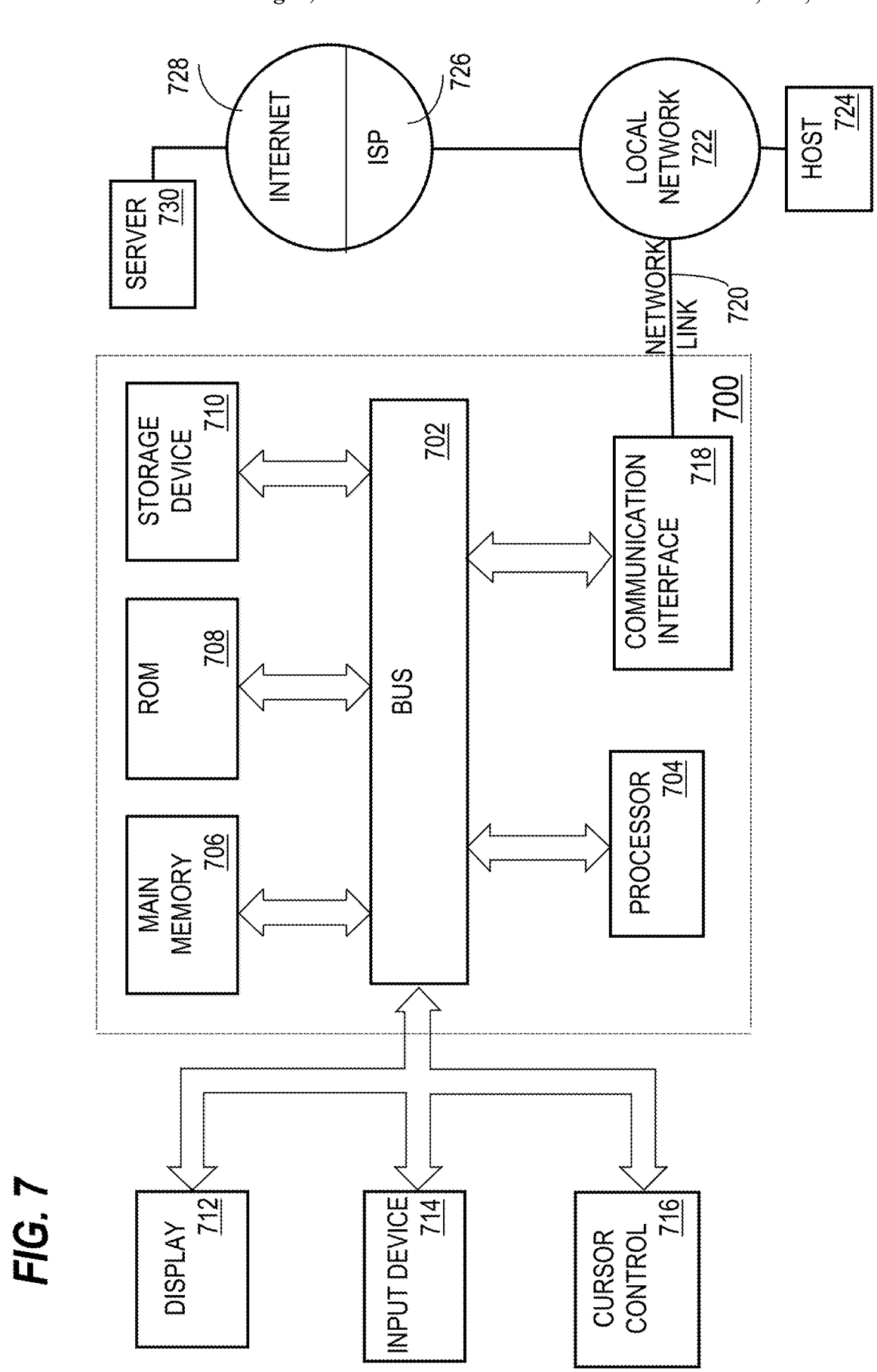
FIG. 7 is a block diagram that illustrates a computer system upon which an embodiment of the invention may be implemented, in accordance with one or more example implementations.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    detecting, by a monitoring application executing at a personal computing device, a user-input-triggered access of a content item, other than a presented content item, during a virtual meeting;
    wherein the user-input-triggered access of the content item is by a content-accessing application executing at the personal computing device;
    wherein the virtual meeting is presented at the personal computing device by a virtual meeting application executing at the personal computing device;
    wherein the monitoring application is different from the virtual meeting application;
    in response to detecting the user-input-triggered access of the content item, causing display, by the monitoring application, of a prompt in a computer graphical user interface presented at the personal computing device, with an option to allow the monitoring application to to remove an association between the content item and the virtual meeting; and
    after a selection of the option, removing, by the monitoring application, content-item-to-virtual-meeting association data that associates the content item with the virtual meeting.

2. The method of claim 1, wherein detecting the user-input-triggered access of the content item during the virtual meeting comprises:
    accessing, by the monitoring application, calendar data that includes a start time and an end time for the virtual meeting, from a calendaring application;
    determining, by the monitoring application, a meeting time window in which the virtual meeting is to be conducted based upon the start time and the end time of the virtual meeting from the calendar data; and
    during the meeting time window, polling, by the monitoring application, for user activity, by a user, associated with the content item;
    wherein the detecting the user-input-triggered access of the content item occurs during the meeting time window for the virtual meeting.

3. The method of claim 1, wherein the content-item-to-virtual-meeting association data includes a timestamp indicating when, during the virtual meeting, the content item was accessed by a user performing the user-input-triggered access of the content item.

4. The method of claim 1, further comprising:
    analyzing, by the monitoring application, a transcript of the virtual meeting for keywords related to the content item;
    determining, by the monitoring application, that one or more keywords are related to the content item; and
    updating, by the monitoring application, the content-item-to-virtual-meeting association data to include timestamps that represent when the one or more keywords were spoken during the virtual meeting.

5. The method of claim 1, further comprising presenting, by the monitoring application, a notification, with an option to share the content-item-to-virtual-meeting association data with additional users who were invited to the virtual meeting.

6. The method of claim 1, wherein the content-accessing application is a web browser.

7. The method of claim 1, wherein the user-input-triggered access of the content item by a content-accessing application represents a user clicking on a link to the content item.

8. The method of claim 7, wherein the link to the content item is presented by the virtual meeting application.

9. The method of claim 1, wherein the content-item-to-virtual-meeting association data is stored locally on the personal computing device.

10. The method of claim 1, wherein the content-item-to-virtual-meeting association data is stored on one or more remote servers accessible by an authorized user.

11. The method of claim 1, further comprising:
    determining, by the monitoring application, that the content item associated with the content-item-to-virtual-meeting association data was accessed by a first user account and a second user account during the virtual meeting, wherein the virtual meeting was attended by the first user account, the second user account, and one or more other user accounts; and
    automatically sharing, by the monitoring application, the content item with the one or more other user accounts.

12. The method of claim 1, further comprising:
    determining, by the monitoring application, that the content item associated with the content-item-to-virtual-meeting association data was accessed by a quorum of user accounts during the virtual meeting, wherein the virtual meeting was attended by the quorum of user accounts and one or more other user accounts, wherein the quorum of user accounts and the one or more other user accounts are distinct sets of user accounts; and automatically sharing, by the monitoring application, the content item with the one or more other user accounts.

13. One or more non-transitory computer-readable media comprising computer program instructions stored thereon, the computer program instructions, when executed by one or more processors, cause the one or more processors to:
detect, by a monitoring application executing on a personal computing device, a user-input-triggered access of a content item, other than a presented content item, during a virtual meeting;
wherein the user-input-triggered access of the content item is by a content-accessing application executing at the personal computing device;
wherein the virtual meeting is presented at the personal computing device by a virtual meeting application executing at the personal computing device;
wherein the monitoring application is different from the virtual meeting application;
in response to the detection of the user-input-triggered access of the content item, cause display, by the monitoring application, of a prompt in a computer graphical user interface presented at the personal computing device, with a first option to allow the monitoring application to store the content item in association with the virtual meeting and a second option to removing an association between the content item and the virtual meeting;
store, by the monitoring application, content-item-to-virtual-meeting association data that associates the content item with the virtual meeting after a selection of the first option to store the content item in association with the virtual meeting; and
removing, by the monitoring application, content-item-to-virtual-meeting association data that associates the content item with the virtual meeting after a selection of the second option to remove the association between the content item and the virtual meeting.

14. The one or more non-transitory computer-readable media of claim 13, wherein the computer program instructions for the detection of the user-input-triggered access of the content item during the virtual meeting cause the one or more processors to:
access, by the monitoring application, calendar data that includes a start time and an end time for the virtual meeting, from a calendaring application;
determine, by the monitoring application, a meeting time window in which the virtual meeting is to be conducted based upon the start time and the end time of the virtual meeting from the calendar data; and
during the meeting time window, poll, by the monitoring application, for user activity, by a user, associated with the content item;
wherein the detection of the user-input-triggered access of the content item occurs during the meeting time window for the virtual meeting.

15. The one or more non-transitory computer-readable media of claim 13, further storing computer program instructions which, when executed by the one or more processors, cause the one or more processors to:
receive, by the monitoring application, a user input request to remove the content-item-to-virtual-meeting association data that associates the content item with the virtual meeting; and
delete, by the monitoring application, the content-item-to-virtual-meeting association data.

16. The one or more non-transitory computer-readable media of claim 13, wherein the content-item-to-virtual-meeting association data includes a timestamp indicating when, during the virtual meeting, the content item was accessed by a user performing the user-input-triggered access of the content item.

17. The one or more non-transitory computer-readable media of claim 13, further storing computer program instructions which, when executed by the one or more processors, cause the one or more processors to:
analyze, by the monitoring application, a transcript of the virtual meeting for keywords related to the content item;
determine, by the monitoring application, that one or more keywords are related to the content item; and
update, by the monitoring application, the content-item-to-virtual-meeting association data to include timestamps that represent when the one or more keywords were spoken during the virtual meeting.

18. The one or more non-transitory computer-readable media of claim 13, further storing computer program instructions which, when executed by the one or more processors, cause the one or more processors to:
present, by the monitoring application, a notification, with an option to share the content-item-to-virtual-meeting association data with additional users who were invited to the virtual meeting.

19. A computer system comprising:
one or more processors;
one or more non-transitory computer-readable media; and
computer program instructions stored in the one or more non-transitory computer-readable media and which, when executed by one or more processors, cause the one or more processors to:
detect, by a monitoring application executing on the computer system, a user-input-triggered access of a content item, other than a presented content item, during a virtual meeting;
wherein the user-input-triggered access of the content item is by a content-accessing application executing at the computer system;
wherein the virtual meeting is presented at the computer system by a virtual meeting application executing at the computer system;
wherein the monitoring application is different from the virtual meeting application;
in response to the detection of the user-input-triggered access of the content item, cause display, by the monitoring application, of a prompt in a computer graphical user interface presented at the computer system, with an option to allow the monitoring application to store the content item with the virtual meeting; and
after a selection of the option to store the content item, store, by the monitoring application, content-item-to-virtual-meeting association data that associates the content item with the virtual meeting.

20. The computer system of claim 19, wherein the computing system is operated by a meeting participant user account other than a presenter user account operating a second computing system.

* * * * *